United States Patent Office 3,239,394
Patented Mar. 8, 1966

3,239,394
PROCESS FOR PRODUCING 7-AMINO-CEPHALOSPORANIC ACID
Robert B. Walton, Rahway, N.J., assignor to Merck & Co., Inc., Rahway, N.J., a corporation of New Jersey
No Drawing. Filed June 15, 1964, Ser. No. 375,349
9 Claims. (Cl. 195—36)

This application is a continuation-in-part of my copending application Serial No. 196,477 filed May 21, 1962, and now abandoned.

This invention relates to the cleavage of an amide linkage in the cephalosporin antibiotics by enzymatic means and more particularly to the production of 7-aminocephalosporanic acid, and to derivatives, such as deacetyl-7-aminocephalosporanic acid, by the hydrolysis of cephalosporins using enzymes produced by microorganisms of the Schizomycetes class.

A large number of penicillin antibiotics have been produced both by fermentation and by organic synthesis or a combination of both. While these penicillins have been remarkably effective as antibiotic drugs, they nevertheless all suffer from at least one notable deficiency, namely, that they are not active against strains of bacteria that release the enzyme penicillinase. In addition, many of the penicillin antibiotics are unstable in acid solution and relatively inactive against gram negative bacteria, particularly the Staph. type of infection.

The new cephalosporin antibiotics, on the other hand, possess broad spectrum activity against both gram positive and gram negative bacteria, are acid stable and are active against penicillin resistant penicillinase producing bacteria. However, unlike the situation in penicillin, the production of the 7-aminocephalosporanic acid intermediates from which the more effective N-acyl cephalosporins may be produced, has been achieved only by acid hydrolysis of the precursor cephalosporin C in yields far below 1%.

An object of the invention, therefore, is to provide an enzymatic method of cleaving the amide linkage in cephalosporin antibiotics.

Another object of the present invention is to provide an enzymatic method of producing key intermediates, such as 7-aminocephalosporanic acid and deacetyl-7-aminocephalosporanic acid.

In accordance with the foregoing objects, what is described herein is a microbiological process for the production of 7-aminocephalosporanic acids and deacetyl-7-aminocephalosporanic acids by the enzymatic hydrolysis of cephalosporins with an amidase produced by microorganisms.

7-aminocephalosporanic acid is the product of the action of a cephalosporin C amidohydrolase on cephalosporin C. For convenience, the trivial name cephalosporin amidase will be employed to describe this enzyme. Microorganisms of the class Schizomycetes also contain other hydrolases including acetic ester acetyl hydrolases which by action on cephalosporin C produce deacetyl cephalosporin C. This enzyme has been given the trivial name esterase. Through the action of esterase, 7-aminocephalosporanic acid may be further hydrolyzed to deacetyl-7-aminocephalosporanic acid. The final product in the preferred form of the process can be 7-aminocephalosporanic acid, deacetyl-7-aminocephalosporanic acid, or a mixture of the two. I have also found that some of the microorganisms containing cephalosporin amidase contain an intracellular cephalosporinase which is capable of destroying the cephalosporins. As will be hereinafter discussed, the action of these enzymes can be inhibited by the addition of certain substances. The enzyme terminology employed in this specification is that recommended by the Report of the Commission on Enzyme, International Union of Biochemistry, Pergamon Press, New York, 1961.

In a preferred form of the present invention, cephalosporin C is hydrolyzed with cephalosporin-C-amidase derived from a bacterial strain of the genus Achromabacter to remove an aminoadipyl side chain from the precursor thereby producing the desired 7-aminocephalosporanic acid derivative.

The invention hereinafter will be illustrated by reference to the use of cephalosporin C itself which has the following formula:

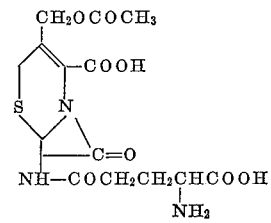

$$NH-COCH_2CH_2CHCOOH$$
$$\phantom{NH-COCH_2CH_2CH}NH_2$$

Although it will be understood that the salts, esters and other cephalosporin derivatives which possess the characteristic amide linkage may be used as well.

In the process of cleaving the amide linkage in the molecule and removing the aminoadipyl side chain from the molecule while leaving intact the acetyl group there is produced the compound 7-aminocephalosporanic acid having the structure:

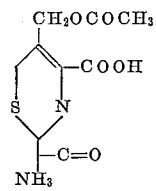

Preferably the process of the present invention is carried out by causing suspensions of the bacteria or of mutants of the bacteria to act upon cephalosporins in the presence of toluene or chloroform, or other preserving agents customarily employed in working with enzymes, although the process also may be carried out suitably in the absence of a preserving agent. Preferably also, the cephalosporins are employed in concentrations of from 1 to 10 mg. or more per cubic centimeter. Depending upon the specific bacterial strain employed, the process is effected at temperatures within the range of from about 20° to 45° C., with 40° representing the optimum operating temperature under most circumstances. It is preferred to conduct the process at pH values within the range of from about 5 to 9.5 and preferably at values between 6 and 8, with the upper part of this range being the optimum. The reaction time is dependent upon the amount of cephalosporin and enzyme employed and may range from 4 hours to 100 hours. Most suitably, the quantities of reactants are selected so as to provide a reaction time of about 4 hours to 72 hours. Under these conditions it is found tthat the cephalosporins are transformed into 7-aminocephalosporanic acid.

In accordance with a further embodiment of this invention, it is found that the cephalosporinase can be inhibited by the addition of a minor amount of 6-aminopenicillanic acid to the medium in which the cleavage of the cephalosporin is being effected. Thus, the addition of a small amount of 6-amino-pencillanic acid of about 1 mg. per ml. or less inhibits the effect of the cephalosporinase and prevents the destruction of the cephalosporin by this enzyme. This provides a very useful method for controlling the destructive enzyme and permits the use of enzymes containing both the cephalosporinase enzyme and the amidase enzyme.

With respect to the selection of suitable microorganisms for use in the biochemical synthesis of the present invention, it is interesting to note that the desired cephalosporin cleavage is generally effected in the presence of a microbial species, or not at all. For this reason, it is not practical to define the operative microbial strains precisely by reference to genera of related microorganisms, but, rather, it is recommended that the selection be made by suitable testing of each species and strain. In this connection, the following testing procedure serves admirably for purposes of determining the ability of microorganisms to form 7-aminocephalosporanic acid derivatives by reaction with cephalosporins.

The suspension of the organism is prepared by inoculating 40 cc. of a suitable nutrient broth with a pure culture of the organism to be tested and cultivating the mixture on a shaking machine for about 24 to 72 hours at 28° C. Thereafter, the cells are separated by centrifugation, washed in 40 cc. of a phosphate buffer solution (pH 7.5) and resuspended in $\frac{1}{10}$ to $\frac{1}{20}$ of the original volume in $\frac{1}{10}$ M phosphate buffer solution at pH 7.5.

To approximately 1 cc. of a phosphate buffer solution pH 7.5 containing 10 mg. of cephalosporin C per cc., an equal volume of a cell suspension in a phosphate buffer solution (pH 7.5) is added.

Following the action of the microbial cells upon the cephalosporin C, the samples are analyzed by paper disc bioassay and bioautograms of descending chromatograms. The descending chromatograms are developed over-night on Whatman No. 1 channel paper using a solvent system consisting of 5 parts of pyridine, 65 parts of isopropanol and 30 parts of water. Duplicate chromatograms are developed. After air-drying, one of the strips is acylated with phenyl acetyl chloride accompanied with a pyridine buffer. The acylation serves to regenerate the bioactivity of any 7-aminocephalosporanic acid or deaacetyl-7-cephalosporanic acid formed by enzymatic hydrolysis of the cephalosporin C. The second strip serves as a control strip. The chromatogram strips are then air-dried and set upon agar previously seeded with *Bacillus subtilis*. After a suitable period of incubation, a zone of inhibition is recorded in terms of mobility on the biaautograms. The following possible positive results are observed:

(a) The bioautogram may show a zone of inhibition at $R_f=0.35$, indicating the presence of 7-aminocephalosporanic acid;

(b) The bioautogram may show a zone of inhibition of $R_f=0.25$, indicating the presence of deacetyl-7-aminocephalosporanic acid;

(c) The bioautogram may show zones of inhibition at $R_f=.18$ and $R_f=.10$ due to residual unreacted cephalosporin C and its hydrolytic product deacetyl cephalasporin C;

(d) A confirming result occurs when the control bioautogram does not show a zone of inhibition at $R_f=.35$ or $R_f=.25$, but does show a response for unreacted antibiotic at $R_f=0.18$ or $R_f=0.10$.

In samples that have been analyzed by paper electrophoresis, the movement of the 7-amino-cephalosporanic acid derivatives is very close to that of 6-aminopenicillanic acid, confirming the presence of the cephalosporin nucleus.

In the foregoing studies it is found that microorganisms which produce cephalosporin amidases and, therefore, are well suited in the process of the present invention, belong to the class of Schizomycetes. The preferred orders within this class are Eubacteriales and Actinomycetales. The genera within the order of Eubacteriales which have been found to be particularly suitable include Brevibacterium, Achromobacter and Flavobacterium, which are presented herein by way of illustration and not of limitation.

In connection therewith, a strain of Achromobacter, employed in the preparation of cephalosporin amidase, is on deposit in the American Type Culture Collection in Washington, D.C., wherein it is identified as ATCC No. 14648. Other deposited cultures including Brevibacterium ATCC No. 14649, Achromobacter ATCC No. 14696 and Flavobacterium ATCC No. 14650 also produce cephalosporin amidase effectively.

For use with a given cephalosporin, it is necessary to select strains that produce cephalosporin amidase enzymes. The invention is not limited to any species of microorganisms, and it does not even aim at each strain of any main species whatsoever. Furthermore, it has been described that each strain of microorganism selected so far for producing cephalosporin amidase is capable of converting cephalosporin used as a substrate, for example, cephalosporin C, into 7-aminocephalosporanic acid or deacetyl-7-aminocephalosporanic acid.

The choice of culture medium does not constitute a critical factor in the present invention. As a matter of fact, any culture medium commonly utilized to grow microorganisms of the type mentioned above may be used. However, it is convenient to emphasize that a medium containing proteinaceous substances naturally will be preferred to mediums which are synthetic. It is quite evident that certain mediums are more convenient than others for a particular microorganism inasmuch as the growth is much faster and the rates of production of cephalosporin amidase are much higher. The preferred culture medium may be determined experimentally and as illustrated in the examples which follow. It is also quite evident that the presence of certain amides or substituted amides in the culture medium will induce or stimulate higher titres of the desired enzyme production.

It should be understood also that the invention is not limited to the organisms mentioned above, which are presented as examples only, but also to mutant species produced by irradiation with X-rays, ultraviolet irradiation, treatment with nitrogen mustards, and the like.

The 7-aminocephalosporanic acid and deacetyl-7-aminocephalosporanic acid produced according to the enzymatic hydrolysis process of the present invention may be isolated from the reaction medium by various processes which are known in the art. However, it should be noted that the solution of 7-aminocephalosporanic acid derivatives also may be used in diluted or in concentrated form. Alternatively, the derivatives may be acylated with a suitable acylating agent, and the resulting N-acyl derivative of 7-aminocephalosporanic acid of deacetyl-7-aminocephalosporanic acid may be extracted with an organic solvent which is nonmiscible with water. When it is desired to obtain the antibiotic in crystalline form, it may be isolated by the technique of ion-exchange or other means of column separation and solvent extraction.

In the specific examples which are presented below, cephalosporin C or a salt thereof is utilized as a starting material in view of its relatively low cost and accessibility. However, it should be emphasized that other cephalosporins may be utilized as well. The choice of a particular cephalosporin will, of course, depend upon economic factors and availability. Therefore, it should be well understood that the following examples are given solely to demonstrate the unique features of the method of preparation which is the subject of the present invention, and should not be construed by way of limitation or restriction thereof.

*Example 1.—Method of isolation of cephalosporin amidase-producing cultures*

50 grams of fertile garden soil is supplemented with various amides and substituted amides to stimulate growth of the microorganisms present therein which are capable of producing cephalosporin amidase. Suitable amides include adipamide, DL-glutamine, D-glutamine, phenylacetylethanolamine, N-(α-aminodipoyl)-aniline and N- phenylacetyl-p-$NO_2$-aniline. In a typical run, 50 mg. of the amide is added to the soil and the mixture is placed in the top of a soil perfusion apparatus similar to that described by Andus (Nature, 158, 419, 1946). 100 ml. of tap water is then added to the reservoir and perfusion is carried out for 10 days. The pH of the liquid is followed daily and is found to rise to about 8.3 as ammonium ion is forming during hydrolysis of the substrate. The N-substituted compounds do not generally give a higher pH upon hydrolysis, but their hydrolysis can be followed by other means.

At the completion of the run the soil is partially dried then plated out in agar in various dilutions which are sufficient to yield agar plates containing well isolated colonies. The colonies thus produced are transferred onto agar slants for the preparation of stock cultures. Accordingly, 40 ml. of a sterile nutrient broth, such as Difco, composed of meat extract and peptone, and 0.2% yeast extract in tap water is inoculated from an agar slunt culture. The culture medium is then incubated at 28° on a shake flask for 24 to 72 hours with agitation and aeration. The culture is then harvested, cells recovered by centrifugation, washed in phosphate buffer and brought up to 1/10 to 1/20 of the original volume in phosphate buffer.

A given stock culture is tested for cephalosporin amidase activity by adding cephalosporin C thereto at a final concentration of 5 mg./ml., incubating at 37° in a water bath and peridoically sampling for 7-aminocephalosporanic acid and deacetyl-7-aminocephalosporanic acid by bioassay and bioautograph techniques.

Cultures found active in this test are employed for preparation of cell suspensions in larger amount for the preparation of and isolation of 7-aminocephalosporanic acid and deacetyl-7-aminocephalosporanic acid.

*Example 2*

Four liters of the following medium is sterilized for 15 minutes at 121° C. and 15 p.s.i.

| | |
|---|---|
| Bacto nutrient broth (Difco) ------------------g-- | 8.0 |
| Bacto yeast extract (Difco) ------------------g-- | 2.0 |
| $K_2HPO_4$ ----------------------------------g-- | 1.0 |
| Phenylacetylethanolamine ---------------------g-- | 1.0 |
| Tap water -----------------------------------ml-- | 1000 |

The medium is inoculated with Achromobacter sp. ATCC 14696 isolated as in Example 1. Incubation is carried out with constant agitation at 28° C. After three days of incubation, the cells are recovered by centrifugation, washed with M/10 pH 7.5 buffer, and finally suspended in 200 ml. M/10 pH 7.5 phosphate buffer plus 1.0 g. of cephalosporin C and 5 ml. toluene. This suspension is incubated at 38° C. in a water bath with constant agitation for 48 hours. Periodic samples are taken for bioassays and bioautograms. After four hours, all of the cephalosporin C has been converted to deacetyl cephalosporin C with a change in mobility of the zones of inhibition on the bioautograms from $R_f$ 0.18 to $R_f$ 0.09. In less than eighteen hours, a zone of inhibition appears at $R_f$ 0.25 upon the phenylacetylated strip but this is not visible on the control strip, indicating hydrolysis to deacetyl-7-aminocephalosporanic acid. This zone of inhibition of the deacetyl-7-aminocephalo sporanic acid at $R_f$ 0.25 becomes successively larger in diameter until after forty-eight hours of incubation.

*Example 3*

A suspension of washed cells of Brevibacterium sp. ATCC 14649 is made by the procedure described in Example 2. Brevibacterium sp. ATCC 14649 contains an intracellular cephalosporinase which is capable of destroying cephalosporin C, in addition to producing the desired amidase. A cephalosporinase inhibitor, 6-aminopenicillanic acid, was added to the cell suspension at a concentration of 1 mg./ml. Cephalosporin C is added as a substrate for enzymatic action at a concentration of 5 mg./ml. Incubation is carried out at 37° C. in a water bath. Periodic samples are removed for bioassay and bioautograms as described in Example 2.

The control bioautogram shows deacetylcephalosporin C at $R_f$ 0.10.

The phenylacetylated bioautogram shows deacetylcephalosporin C at $R_f$ 0.10. In addition, the desired products of amidase action are observed at $R_f$ 0.25 and $R_f$ 0.33. These are the $R_f$ values characteristic of deacetyl-7-aminocephalosporanic acid and 7-aminocephalosporanic acid. In addition, a zone of inhibition is present at 0.46 due to the presence of the cephalosporinase inhibitor, 6-aminopenicillanic acid.

*Example 4*

Washed cells of Achromobacter sp. ATCC 1496, prepared as described in Example 2, were suspended in M/10 pH 5.0 phosphate buffer with 5 g. per ml. cephalosporin C. Incubation was at 37° C. in a water bath. Samples were withdrawn periodically for bioassay and bioautograms.

The control bioautogram showed a zone of antibiotic action at $R_f$ 0.10 characteristic of deacetylcephalosporin C.

The phenylacetylated bioautogram showed deacetylcephalosporin C at $R_f$ 0.10. In addition, the desired product of amidase action, 7-aminocephalosporanic acid, was indicated by the presence of a zone of inhibition at $R_f$ 0.33.

*Example 5*

Washed cells of Flavobacterium sp. ATCC 14650 were prepared as described in Example 2. The cells were suspended in M/10 phosphate buffer at pH 6.5, 7.5 and 8.5. Cephalosporin C as a substrate and 6-amino-penicillanic acid as a cephalosporinase inhibitor were added as in Example 3. Incubation was at 37° C. and samples were removed periodically for bioassay and bioautograms.

The control bioautogram showed zones of antibiotic action at $R_f$ 0.10 and $R_f$ 0.18 characteristic of deacetylcephalosporin C and cephalosporin C.

The phenylacetylated bioautogram showed zones of antibiotic action as in the control bioautogram and, in addition, zones at $R_f$ 0.35 characteristic of 7-aminocephalosporanic acid and at $R_f$ 0.46 due to residual cephalosporinase inhibitor.

At the conclusion of the run, the 7-aminocephalosporanic acid or the deacetyl derivative is recovered by an ion-exchange procedure. Accordingly, the solution is adsorbed on a cation resin Dowex 50, X–4 during the hydrogen cycle at a pH of about 2.5. The resin is eluted with dilute ammonium hydroxide at a pH of about 8.0 The eluate from this resin is then adsorbed on an anion exchange resin such as Dowex 1, X–8 during the chloride cycle. The resin is now eluated with a mixture of sodium chloride or dilute hydrochloric acid. The eluate from this resin column is then concentrated and the 7-aminocephalosporanic acid or deacetyl-7-aminocephalosporanic acid is crystallized from the concentrate.

While the invention has been described with particular reference to certain preferred embodiments thereof, it will be understood that other changes and modifications may be made which are within the skill of the art.

What is claimed is:

1. A process for producing 7-aminocephalosporanic acid which comprises intimately contacting a cephalosporin from the group consisting of cephalosporin C and salts thereof in an aqueous medium with enzymes produced by a cephalosporin amidase-producing strain of a microorganism selected from the genera consisting of Brevibacterium, Archomobacterium and Flavobacterium.

2. The process of claim 1 wherein the aqueous medium contains a minor amount of 6-aminopenicillanic acid.

3. A process for producing 7-aminocephalosporanic acid which comprises intimately contacting a cephalosporin from the group consisting of cephalosporin C and salts thereof in an aqueous medium with enzymes produced by a celphalosporin amidase-producing strain of a microorganism selected from the genera consisting of Brevibacterium, Achromobacterium and Flavobacterium, and recovering the 7-aminocephalosporanic acid from the resulting aqueous solution.

4. The process of claim 3 wherein the microorganism is a Brevibacterium.

5. The process of claim 3 wherein the microorganism is an Achromobacterium.

6. The process of claim 3 wherein the microorganism is a Flavobacterium.

7. The process of claim 3 wherein the microorganism is Brevibacterium, ATCC No. 14,649.

8. The process of claim 3 wherein the microorganism is Achromobacterium, ATCC No. 14,648.

9. The process of claim 3 wherein the microorganism is Flavobacterium, ATCC No. 14,650.

References Cited by the Examiner
UNITED STATES PATENTS

| | | | |
|---|---|---|---|
| 3,014,845 | 12/1961 | Rolinson et al. | 195—36 |
| 3,082,155 | 3/1963 | Kelly et al. | 195—36 |

A. LOUIS MONACELL, *Primary Examiner.*

D. M. STEPHENS, *Assistant Examiner.*